UNITED STATES PATENT OFFICE.

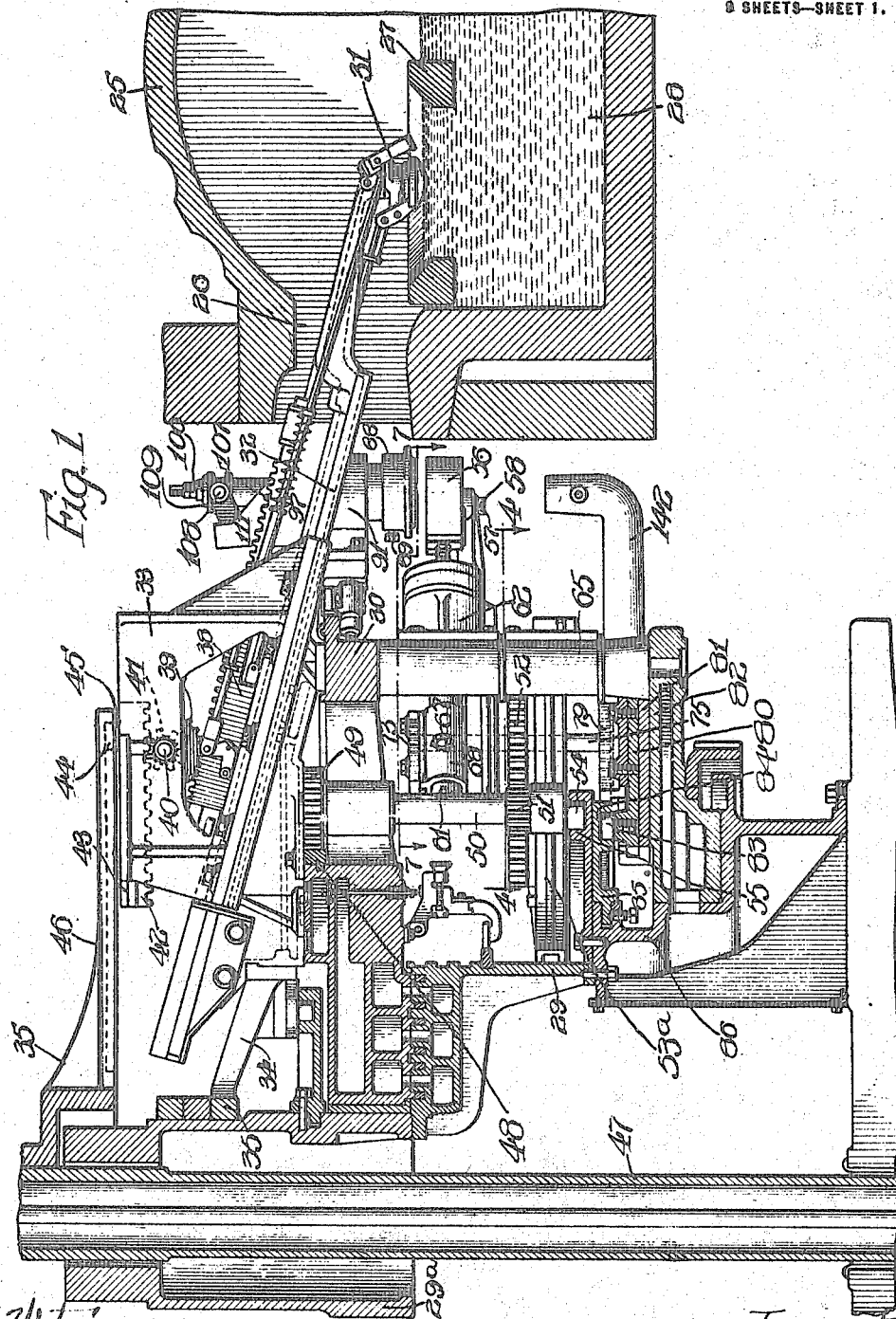

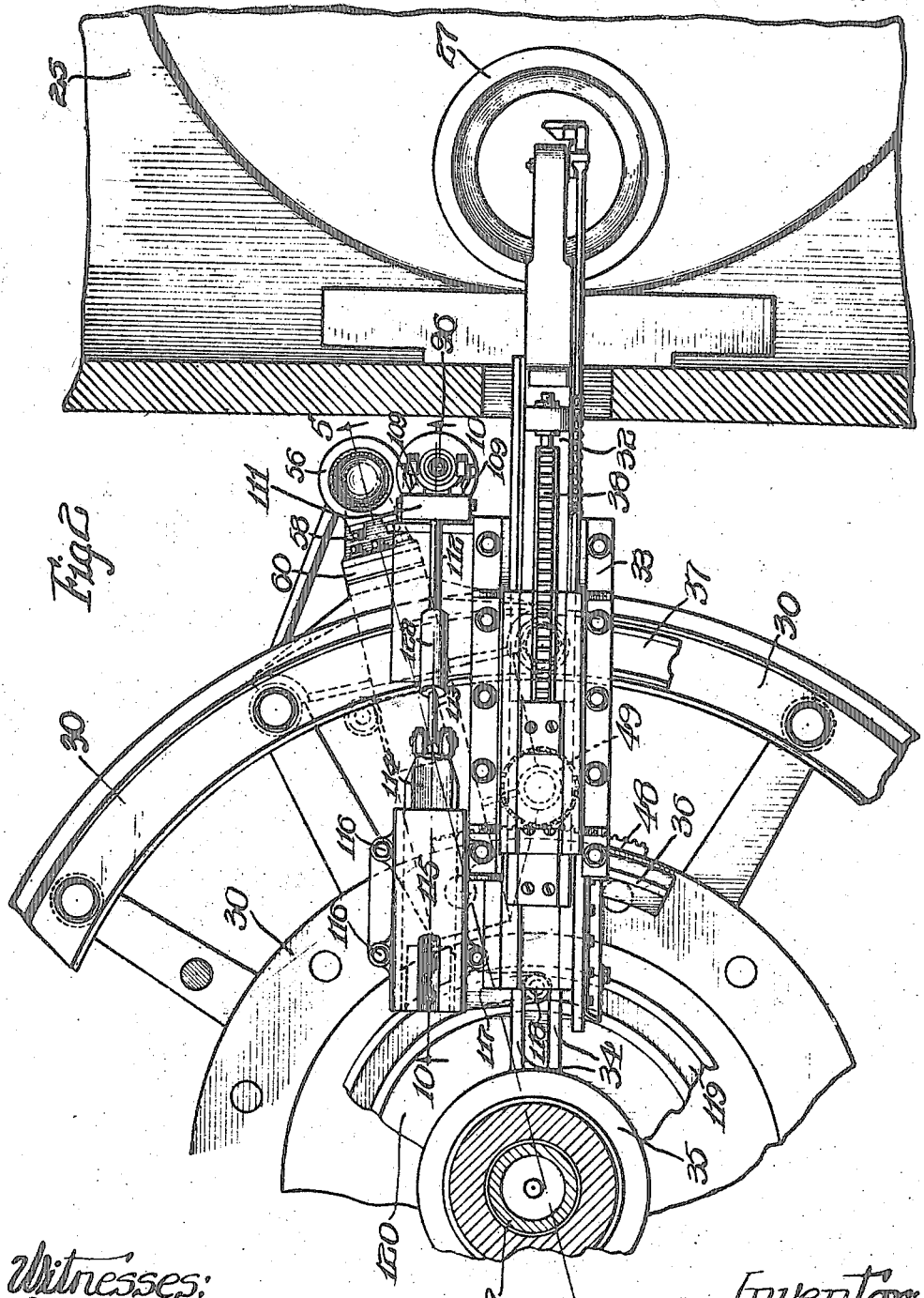

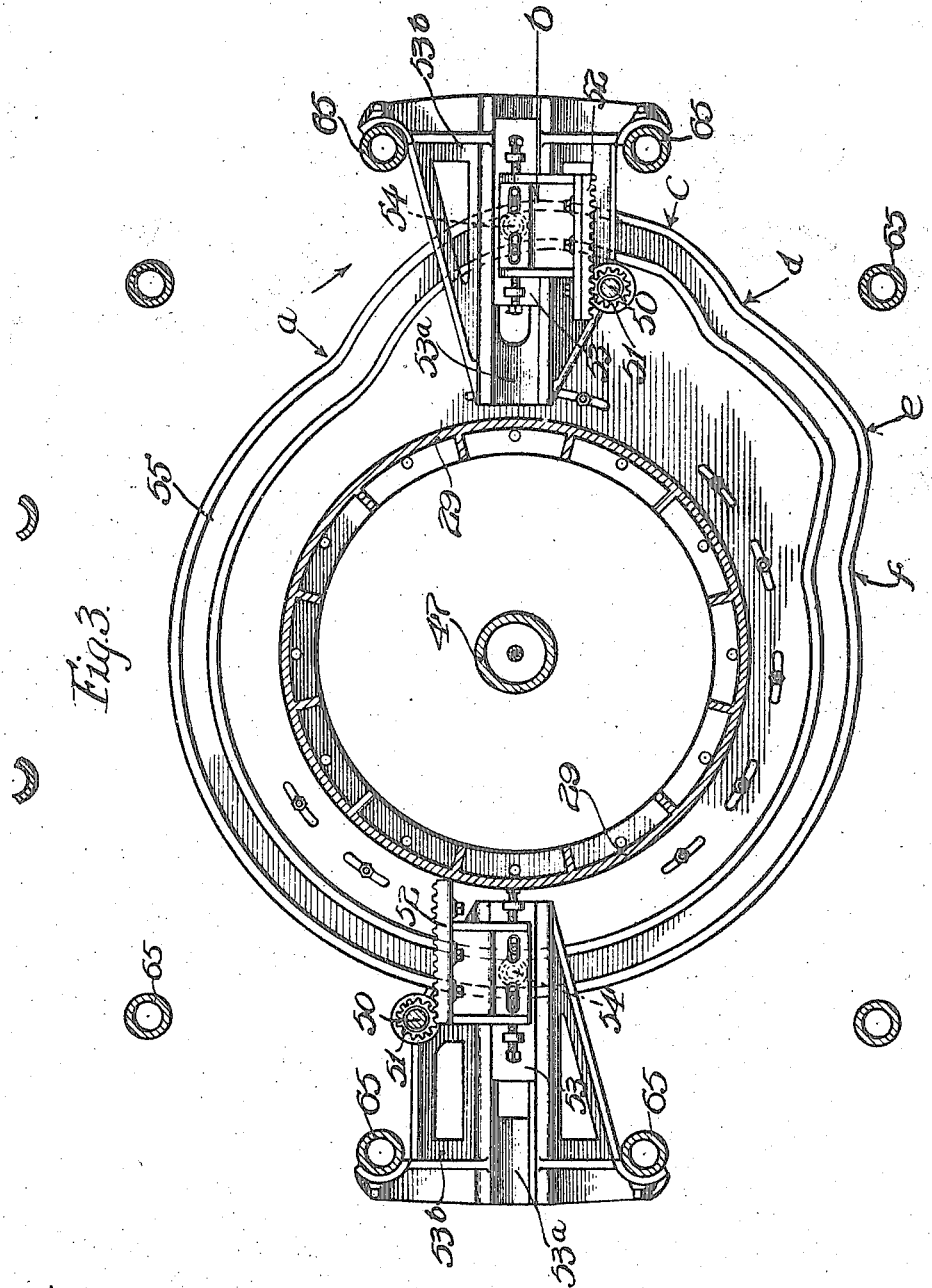

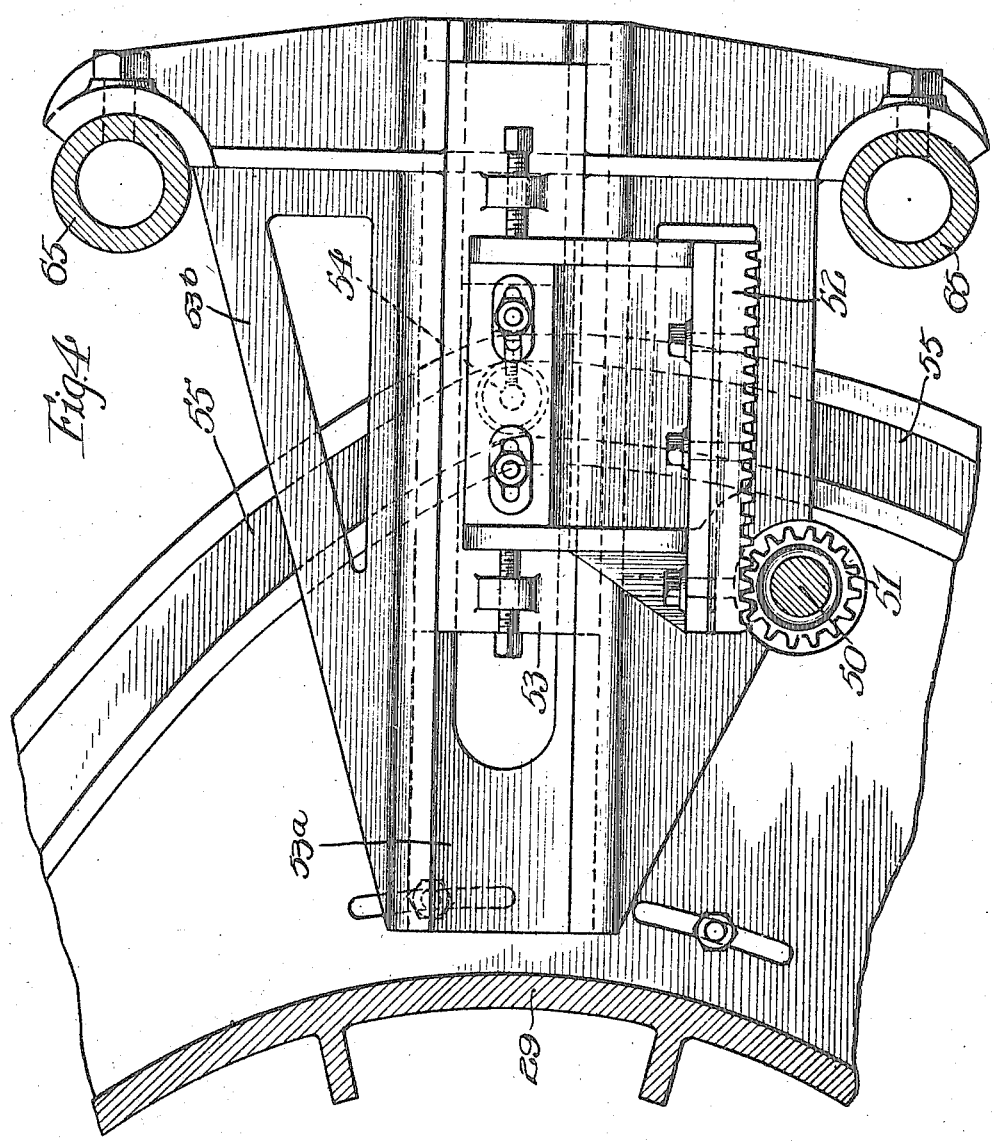

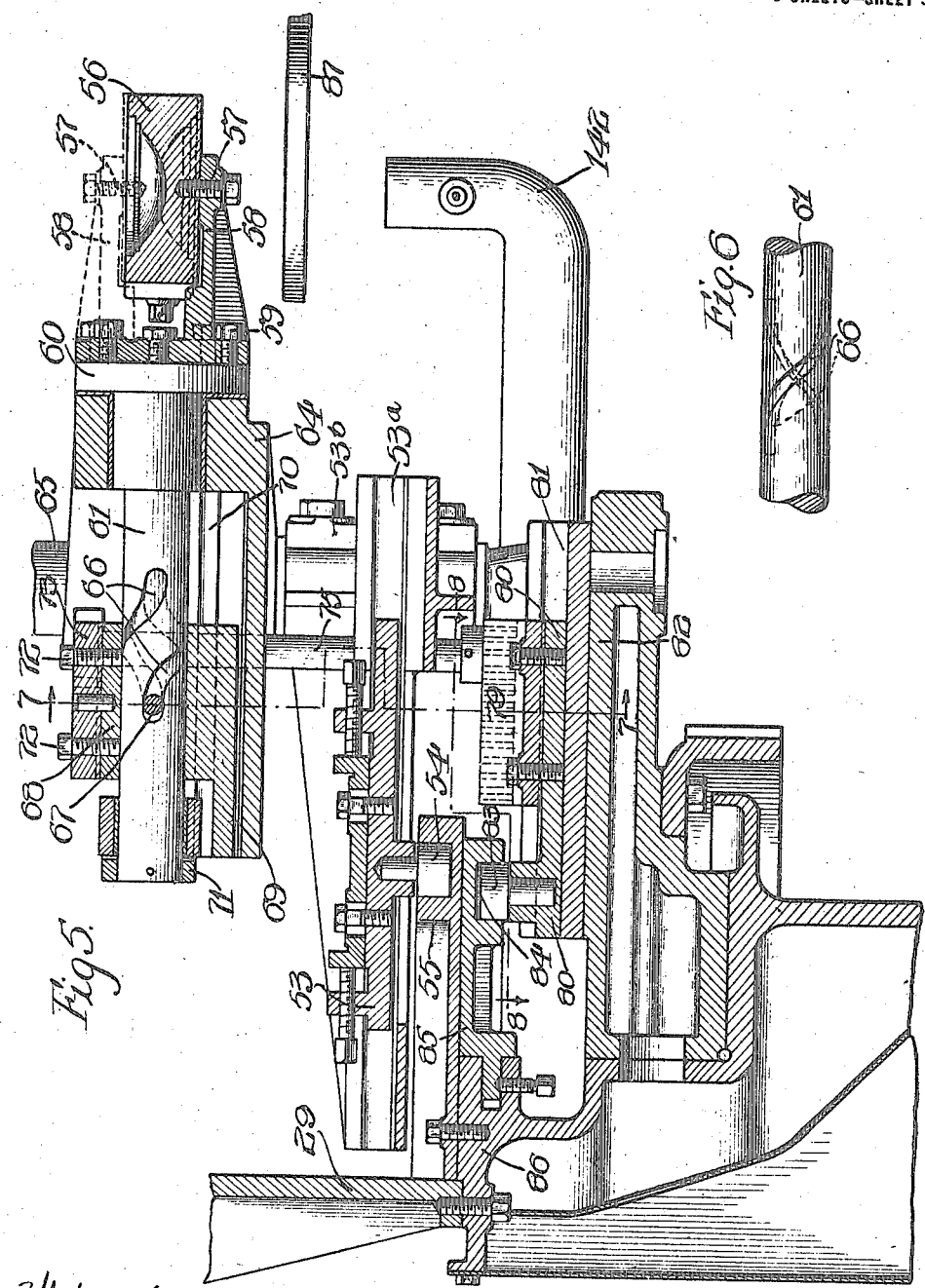

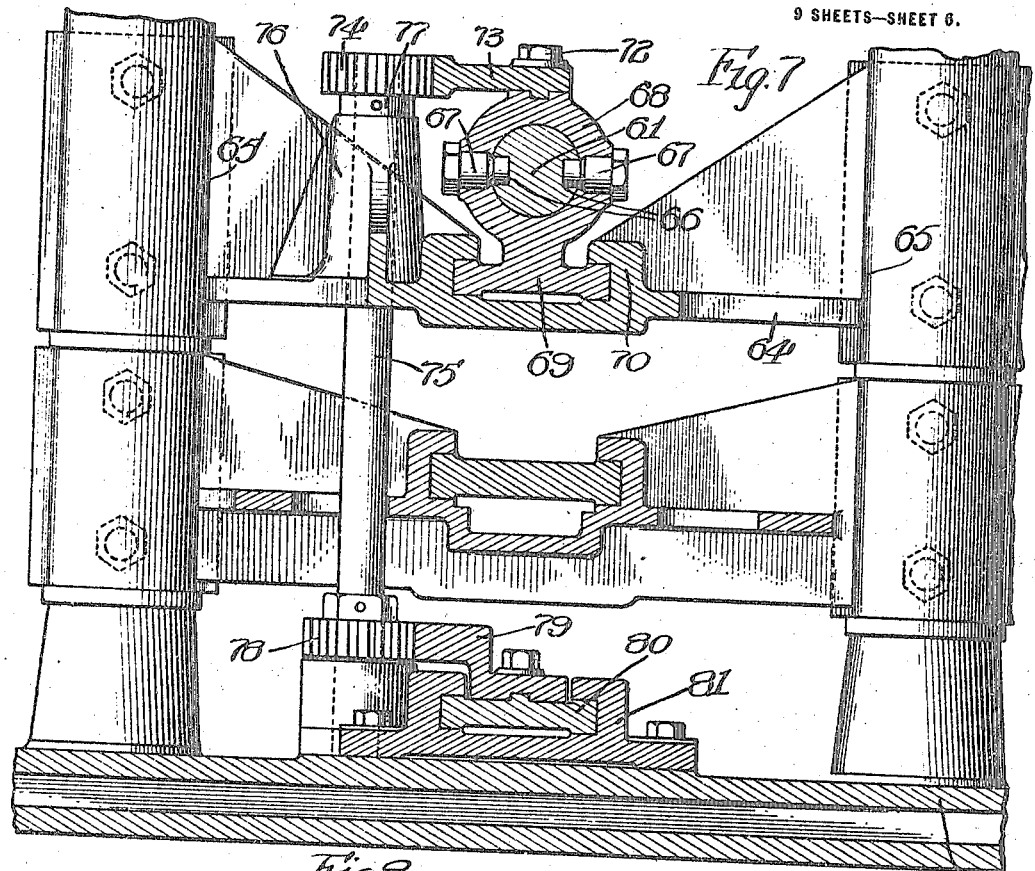
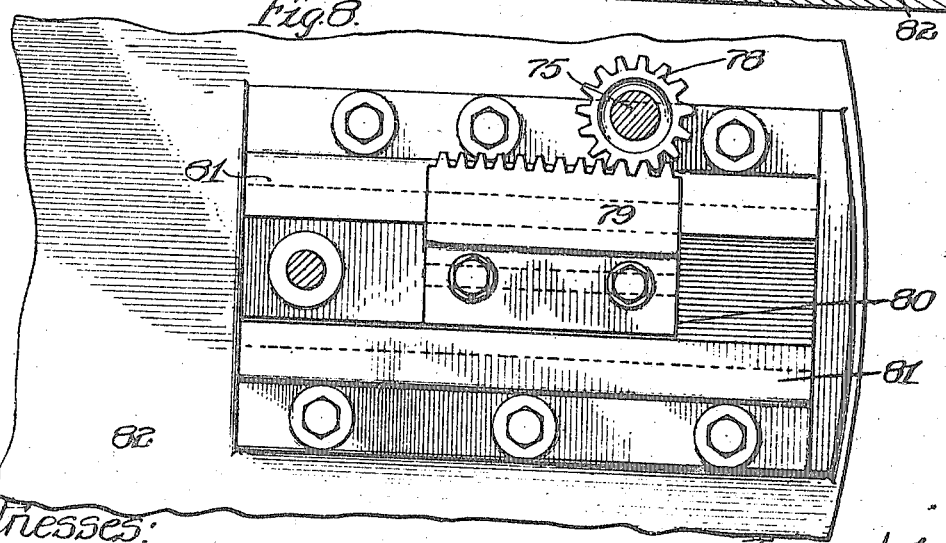

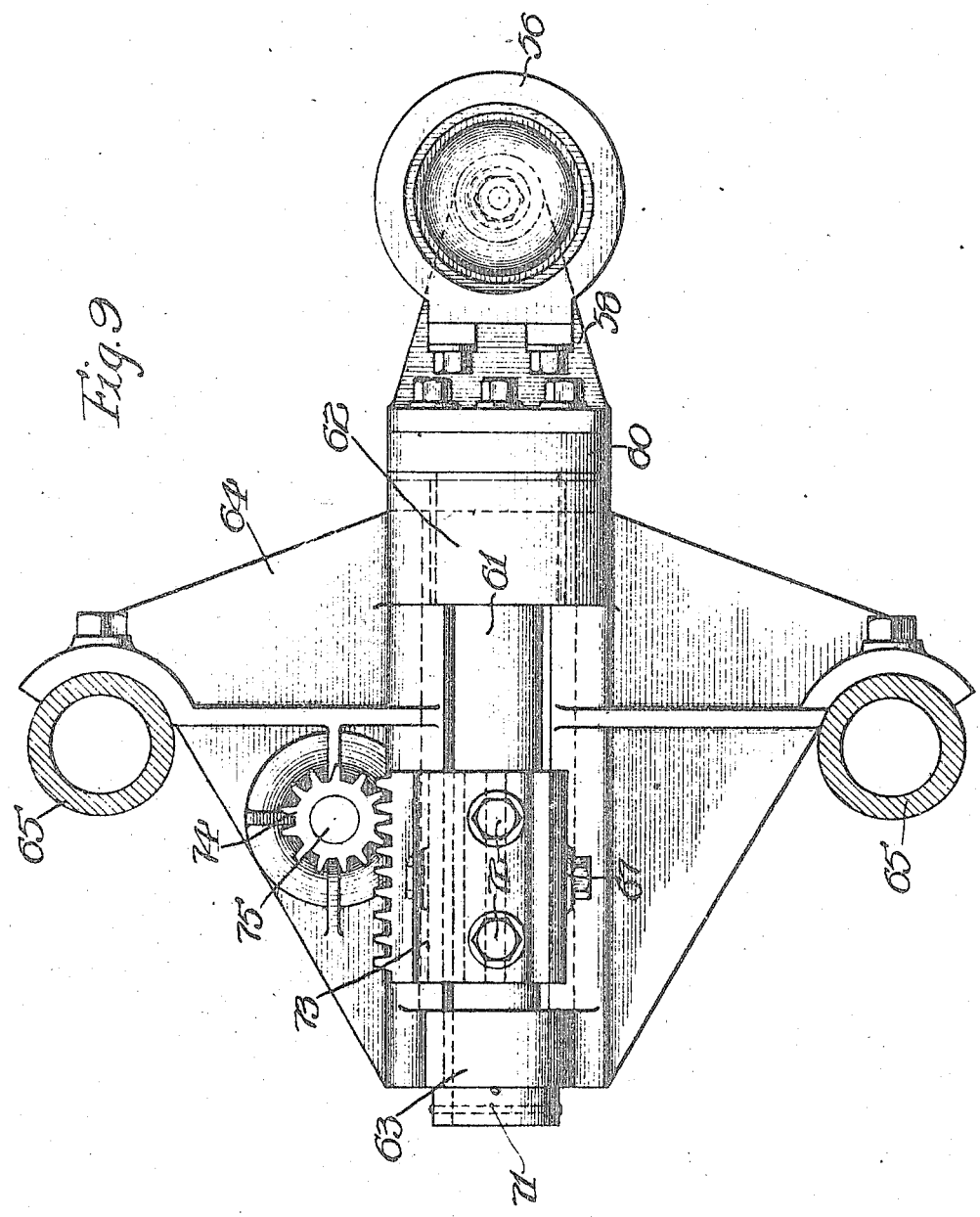

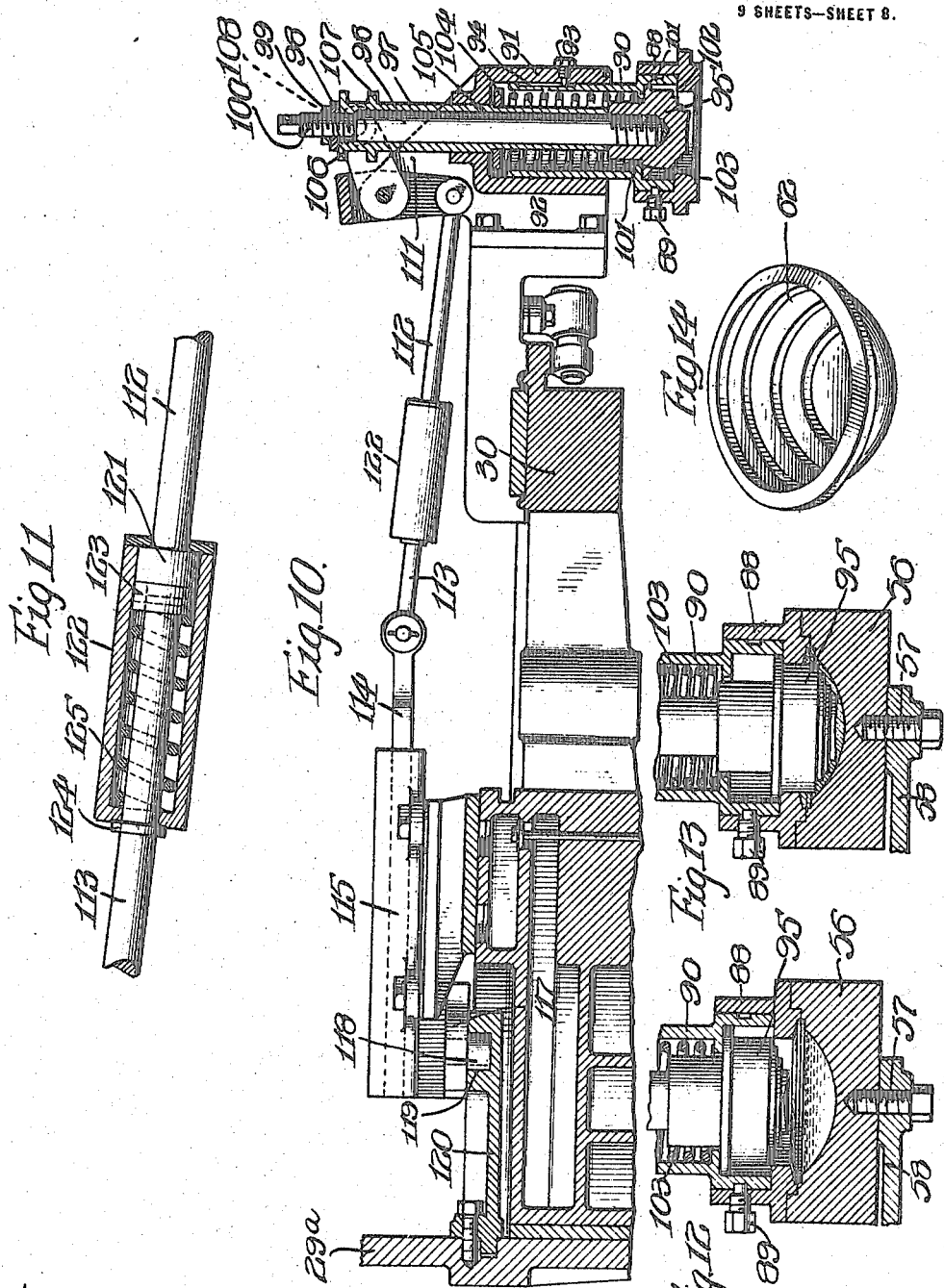

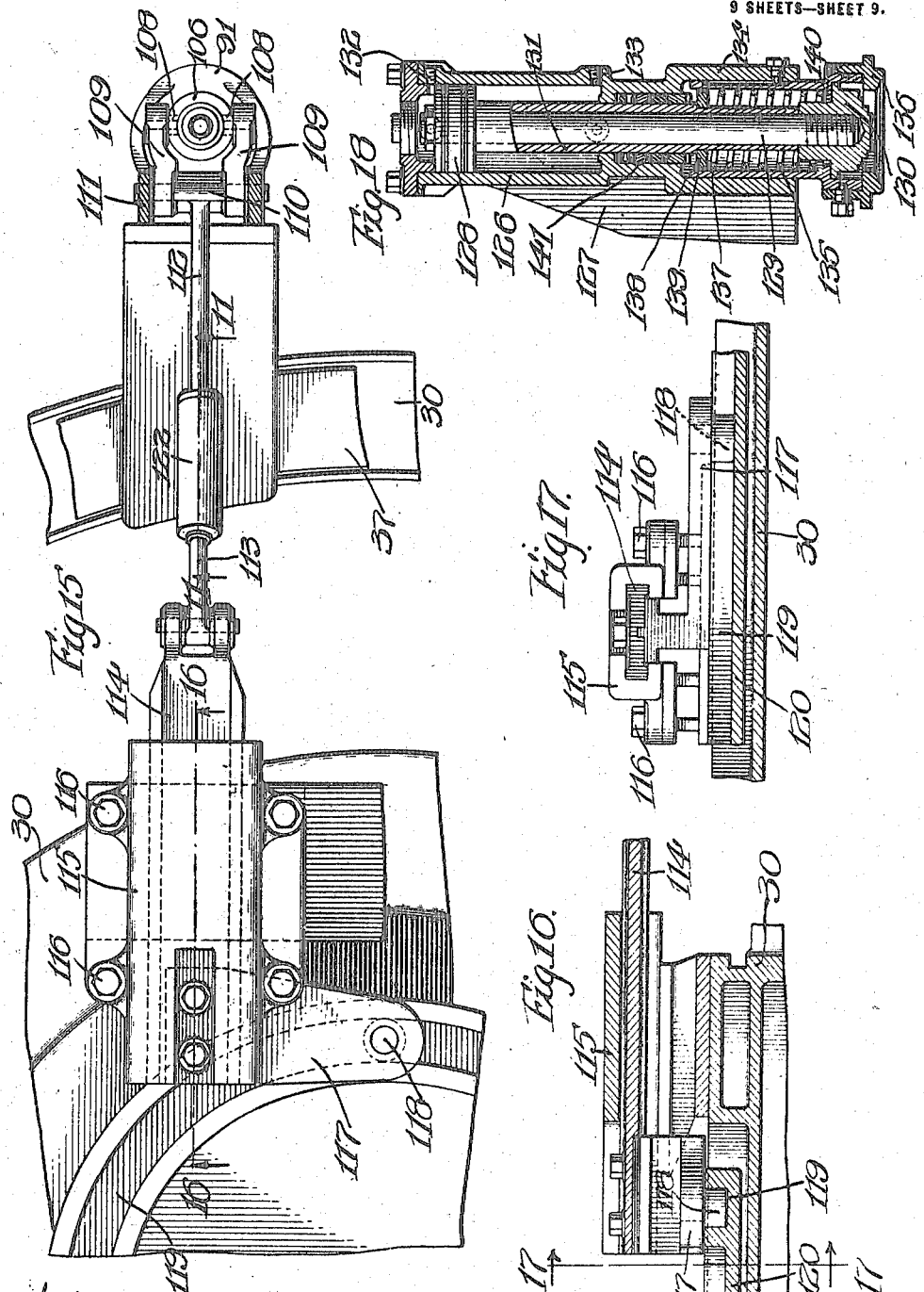

AUGUST KADOW, OF TOLEDO, OHIO, ASSIGNOR TO THE WESTLAKE MACHINE COMPANY, OF TOLEDO, OHIO, A CORPORATION OF OHIO.

MACHINE FOR MAKING PRESSED GLASSWARE.

1,264,085.      Specification of Letters Patent.      Patented Apr. 23, 1918.

Application filed September 11, 1912. Serial No. 719,868.

*To all whom it may concern:*

Be it known that I, AUGUST KADOW, a citizen of the United States, residing at Toledo, in the county of Lucas and State of Ohio, have invented certain new and useful Improvements in Machines for Making Pressed Glassware, of which the following is a specification.

My invention relates to glass forming apparatus and the object of the invention is to provide a machine for manufacturing pressed glassware by a series of automatically performed operations. The invention consists in certain novel and improved devices for accomplishing this purpose.

A further object of the invention is to provide a machine consisting of a number of glass working units arranged upon a rotating support so that the units are periodically brought before the working opening of a glass furnace, a charge of glass being gathered by each unit as it is in position before the furnace and pressed into the desired shape and discharged from the mold before the unit completes the rotational movement around the axis of the machine, the machine thereby providing for a continuous output by a number of separate operations proceeding simultaneously.

The invention has for a further object to provide a glass working machine having the improved features and consisting of the novel arrangements, constructions and devices shown in the accompanying drawings and which will be hereinafter fully described and claimed.

The invention is illustrated, in a preferred embodiment, in the accompanying drawings, wherein—

Figure 1 is a radial sectional view, taken through one unit of the machine and a part of the glass furnace;

Fig. 2, a sectional plan of the parts shown in Fig. 1;

Fig. 3, a diagrammatic view of the cam which controls the circular movements of the gathering mechanism;

Fig. 4, a sectional plan taken on line 4—4 of Fig. 1;

Fig. 5, a sectional view on line 5—5 of Fig. 2, looking in the direction of the arrows, this view being intended particularly to show the mold and the mechanism for reversing the same;

Fig. 6, a detail view of the reversing shaft for the mold;

Fig. 7, a sectional view taken on line 7—7 of Fig. 5, looking in the direction of the arrows;

Fig. 8, a sectional plan on line 8—8 of Fig. 5;

Fig. 9, a plan view of the mold and its reversing mechanism;

Fig. 10, a sectional view taken on line 10—10 of Fig. 2, looking in the direction of the arrows, this view being intended to show particularly the construction and operation of the presser;

Fig. 11, a longitudinal sectional view taken on line 11—11 of Fig. 15;

Figs. 12 and 13, sectional views of the mold and presser showing the elements of the presser in different positions;

Fig. 14, a view, in perspective, of the glass article which the machine is designed to produce;

Fig. 15, a plan view of the parts shown in Fig. 10;

Fig. 16, a sectional view taken on line 16—16 of Fig. 15, looking in the direction of the arrows;

Fig. 17, a sectional view taken on line 17—17 of Fig. 16, looking in the direction of the arrows; and Fig. 18, a longitudinal sectional view of a modified form of presser.

Like characters of reference designate like parts in the several figures of the drawings.

In the preferred form of my invention shown in the drawings the machine consists of a number of units supported upon a circular frame work which rotates around a stationary drum. The units are identical, each unit consisting of a set of apparatuses capable of turning out a completely formed pressed article. Hence it is necessary to show and describe only a single unit.

Each unit comprises a gathering device which is projected into the working opening of the furnace, gathers a charge of glass therefrom and is then withdrawn from the furnace. This is done, without interrupting the movement of the rotating frame of the machine, by means of mechanism which operates to move the gathering mechanism back on the framework at the same rate of speed at which the framework is rotated, the result being that the gathering device has no translatory movement with respect to the furnace during the gathering operation. The unit comprises further a mold in fixed position on the rotating support and a presser for the mold associated with the gathering device. The same mechanism as is employed for stopping the translatory movement of the gathering device during the gathering operation is utilized for: first, positioning the gathering device, after it has been withdrawn from the furnace, over the mold and holding it there momentarily, so that the charge may be delivered into the mold; second, positioning the presser over the mold and holding it there during the pressing operation, and third, returning the gathering device and presser to their initial relative positions with respect to the mold. After this the mold is inverted so as to discharge the article that has been pressed therein. This completes the cycle of operations, which, it will be understood, takes place during a single rotation of the machine about its axis.

Referring to the drawings, 25 designates a glass furnace having a working opening 26. 27 designates the usual ring of refractory material which floats on the body of glass 28 in the furnace. The glass is gathered from a point within the ring. 29 designates the stationary drum and 30 the rotating framework or support on which the several glass working units are supported.

Glass gathering mechanism.

The glass gathering mechanism of this invention may be, and preferably is exactly like the gathering mechanism forming a part of the machine for blowing electric light bulbs manufactured by the Westlake Machine Company of Toledo, Ohio, and fully described in my application for patent, Serial No. 570,621, filed July 6, 1910. By means of this mechanism the glass is drawn up into the blank or gathering mold by suction and is discharged from said mold by gravity. In the drawings herein 31 designates the gathering device. The particular construction of the gathering device forms in itself no part of my present invention. Any suitable device might be used for gathering a measured quantity of glass from the body of glass in the furnace. Therefore it will not be necessary to describe the rather complicated structure of the gathering device and the arrangement of ports, ducts, valves, and the like, whereby the vacuum is produced in said gathering device, these arrangements being all shown and described in the application for patent above referred to.

The gathering device 31 is carried on the end of a ram 32 which is slidable radially of the machine, in a housing 33. The housing is mounted on the rotating frame 30 so that it is capable of circular movement on the frame within certain limits. The housing is secured by webs 34 to a ring 35 which has sliding engagement with the upper section 29ª of the drum 29. Secured to the under side of the housing are curved shoes 36, 37 which bear and slide upon the framework 30.

The mechanism for reciprocating the ram so as to thrust it into and withdraw it from the glass furnace is constructed as follows: Fixed to the ram 32 is a rack 38 (Figs. 1 and 2) which is meshed by a pinion 39 carried on a shaft 40 turning in bearings in the housing 33. Rigid with the pinion 39 is a smaller pinion 41 which is meshed by a rack 42 carried on a slide 43. The slide has a roller 44 which projects into a cam slot 45 in the cam 46. The latter is carried on the rotating shaft 47 which rotates at a speed which is different from that of the frame 30. The cam is so timed that the slide 43 is drawn inwardly when the gathering mechanism is brought opposite the working opening 26 of the furnace. This movement of the slide 43 causes the ram to be thrust into the furnace until the gathering device 31 is brought in contact with the surface of the glass. The cam then forces the slide 43 forward which withdraws the ram from the furnace returning it to its original position.

The mechanism for stopping the rotation of the housing 33, and the ram, during the gathering operation, reference being made particularly to Figs. 1 to 4 inclusive, is constructed as follows: 48 designates a rack secured to the under side of the housing 33, and 49 a pinion meshing with said rack and carried on a shaft 50 rotatably mounted on the frame 30. The shaft 50 carries on its lower end a pinion 51 which meshes with a rack 52 on a slide 53 which moves in a slideway 53ª formed in a casting 53ᵇ secured to the rotating frame of the machine. On the under side of the slide is a roller 54 which moves in a camway 55. After the roller 54 reaches the point $a$ of the camway 55 (Fig. 3) it moves away from the center of rotation of the machine. This thrusts the slide 53 outwardly which gives the pinions 51, 49 a clockwise rotation that causes the housing to be rotated backwardly, with respect to the rotation of the framework 30, the parts of the mechanism being so proportioned as to give the movement backward of the housing of the gathering mechanism the same velocity as the forward movement of the frame. As a result the gathering mechanism has no circular movement so long as slide 53 continues to move outwardly. It is during this period that the ram is thrust into the furnace, the charge gathered and the ram withdrawn from the furnace and returned to its initial position.

If any part of the camway 55 is concentric with the rotating frame the slide 53 will remain stationary while the roller 54 is in that part. If the camway bends in toward the center the slide will be moved inwardly with the result that the gathering mechanism will be moved circularly upon the rotating frame 30 in the same direction as the frame is rotating. The last mentioned movement is used for bringing the gathering device 31 into position over the mold and then the presser into position over the mold and thereafter moving the latter away from the mold so that the mold may be inverted.

*The mold and mechanism for inverting the same.*

This mechanism is shown particularly in Figs. 5 to 9 inclusive. 56 designates the mold which is secured by a screw 57 to a bracket 58 attached by bolts 59 to the head 60 of a shaft 61. The configuration of the mold will, of course, depend upon the shape of the article to be formed therein. The mold in the present machine is so shaped as to produce the lantern lens or bull's eye 62' shown in Fig. 14.

The shaft 61 is mounted in bearings 62, 63 formed on a casting 64 which is bolted to the uprights 65 forming a part of the rotating frame of the machine. The shaft is formed with two parallel spiral slots 66 into which project the extremities of pins 67 fixed in a sleeve 68 which surrounds the shaft 61 and is formed with a slide 69 movable in a slideway 70 formed on the casting 64. A collar 71 is fixed to the end of the shaft 61. Secured to the sleeve 68 by bolts 72 is a rack 73 which is meshed by a pinion 74 carried on the upper end of a shaft 75 turning in the vertical bearing 76 formed on the casting 64 and supported by a collar 77 arranged under the pinion 74. The lower end of the shaft 75 carries a pinion 78 which is meshed by a rack 79 secured to a slide 80 mounted in a slideway 81 secured to a casting 82 forming a part of the rotating framework of the machine. The slide 80 carries a roller 83 which runs in a camway 84 formed in the under surface of the cam 85 which is secured to a casting 86 forming a part of the stationary structure or drum around which the rotary part of the machine is moved.

When the slide 80 and rack 79 are moved outwardly by an outward bend of camway 84 the shaft 75 is revolved in the direction which moves the rack 73, sleeve 68 and slide 69 outwardly. The rectilinear movement of pins 67 in the spiral slots 66 gives the shaft 61 a half revolution which inverts the mold 56. The inverted position of the mold is indicated by the dotted lines in Fig. 5. The article formed in the mold is discharged when the mold is inverted and may be received upon any suitable receiving means such as indicated at 87 in Fig. 5. An inward movement of slide 80 actuated by the deflection of the camway 84 toward the center of the machine produces a half revolution of shaft 61 in the opposite direction which returns the mold to its initial position.

*The presser and mechanism for actuating the same.*

The preferred form of presser and its actuating mechanism are best shown in Figs. 2, 11 to 13 inclusive, and 15 to 17 inclusive. The element which has been termed generally the presser (inasmuch as it is brought to bear upon the glass in the mold to press it to the desired shape) consists preferably of a cover which fits down over the top of the mold 56 and a plunger operating through an opening in the cover. The cover 88 is secured by a set screw 89 to a sleeve 90 slidably arranged in a cylinder 91 formed on a casting 92 which is secured to the rotating frame 30. The sleeve 90 is guided by a guide pin 93 fixed in the cylinder 91 and projecting into a slot 94 in the sleeve. 95 designates the plunger which has a shank 96 surrounded by a sleeve 97, which latter is fixed between the plunger and nuts 98, 99 on the upper threaded end 100 of the shank 96. The plunger 95 is confined between an annular projection 101 on the inside of the sleeve 90 and the shoulder 102 formed on the inside of the cover 88. A spiral spring 103 is interposed between the annular projection 101 and a disk 104 seated against a shoulder 105 on the sleeve 97. The upper end of the sleeve 97 is formed with the rings 106, 107 between which extend pins 108 on the bell cranks 109 fixed on a rock shaft 110 mounted in a housing 111 formed on the casting 92. A two-part connecting rod 112, 113 connects the bell cranks 109 with a slide 114 mounted in a housing 115 secured by bolts 116 to the rotating frame 30. The slide 114 is provided with a laterally projecting arm 117 carrying on the under side a roller 118 which travels in the camway 119 formed in the cam 120 which is secured to the upper section 29ª of the stationary drum.

When the configuration of the camway 119 is such as to draw the slide 114 inwardly toward the center of the machine the bell cranks 109 are rocked so as to force the presser down toward the mold 56. This movement is timed so as to take place during the period that the presser stands directly over the mold. Because of the interposition of spring 103 between the plunger and the sleeve 90 the plunger in moving downward carries with it the cover 88. After the cover has been seated upon the mold 56 the plunger continues to move downward putting spring 103 under compression. The molten glass is pressed into shape between the mold cover and plunger.

The connecting rod 112, 113 is made in two pieces in order that a flexible connection may be provided which will prevent the destruction of the apparatus in case the cover meets with any opposition in closing such, for example, as would be presented by a hardened or lumpy condition of the charge of glass in the mold. The rod 112 terminates in a boss 121 (Fig. 11) which is inclosed in the cylindrical casing 122. The rod 113 carries on its extremity a collar 123 and outside of the casing 122 a collar 124. A spiral spring 125 which is heavier than the spring 103 in the presser is interposed between the collar 123 and the end of casing 122. Ordinarily the spring 125 is inoperative. Being stronger than spring 103 it is not compressed when the slide 114 is moved inwardly. If, however, the presser meets an obstruction of a character to damage the mechanism the spring 125 will yield.

In Fig. 18 I have shown a modified form of presser which is operated by a motive fluid instead of by the cam-actuated mechanism above described. 126 designates a cylinder carried on a casting 127 which corresponds to the casting 92 of the mechanism just described. Within the cylinder is a piston 128 to which is secured a threaded stem 129 carrying the plunger 130, the stem being surrounded by a sleeve 131 rigidly connected thereto as in the other construction. The cylinder 126 is formed with ports 132, 133 through which a motive fluid, compressed air or steam, for example, may be introduced into the cylinder to move the piston 128 up and down. Below the cylinder 126 is a cylinder 134 in which slides a sleeve 135 carrying at its lower end the mold cover 136. A spring 137 is interposed between a disk 138 bearing against a shoulder 139 on the sleeve 131 and an annular projection 140 on the interior of the sleeve 135. The sleeve 135 is guided as in the construction previously described. Preferably packing 141 is interposed around the plunger sleeve 131 between the cylinders 126 and 134. The operation of this form of device is exactly the same as the preferred form of presser first described except that the plunger is moved up and down by motive fluid instead of by the cam mechanism of the other construction.

*Operation.*

The operation of the machine is as follows: As each unit is brought by rotation of the frame 30 opposite the working opening 26 of the furnace 25 the cam 46 causes the roller 44, slide 43 and rack 42 to move inwardly. The rotation of the pinion 39 produced by this movement, which pinion meshes with the rack 38 on the ram 32, thrusts the ram into the working opening of the furnace until the gathering device 31 is brought into contact with the molten metal within the ring 27. The metal is sucked up into the gathering device by the vacuum produced in said device (as described in my application above referred to) and the ram is then withdrawn from the furnace by a reverse movement of the mechanisms just described.

During this operation the housing 33 in which the ram is mounted is moved back on the rotating frame at the same velocity as the frame is rotated in a forward direction. As a result the housing and ram have no movement of translation with respect to the furnace while the ram is entering and being withdrawn from the furnace. The backward movement of the housing is accomplished by the movement outward of the slide 53 and takes place while the roller 54 is moving from the point $a$ to the point $b$ in the cam groove 55 (Fig. 3). The movement of the slide 53 rotates shaft 50 and the pinion 49 on the upper end of this shaft is thereby rotated clockwise. The pinion meshes with the segmental rack 48 on the under side of the housing 33.

By referring to Fig. 3 it will be seen that the next section of the camway through which roller 54 passes, namely, the section between $b$ and $c$, is concentric with the axis of the machine. Hence while the roller is passing through this portion of the camway slide 53 remains stationary and the gathering mechanism travels in the same direction as the rotating frame and at the same speed. During the period between $a$ and $b$ the mold which is normally back of the gathering mechanism has had an opportunity to catch up with said mechanism since the latter remained stationary. When the point $b$ is reached the axial line of the mold is directly under the axial line of the gathering mechanism. By this time, it will be understood, the ram has been withdrawn from the furnace so that it stands in a position directly above the mold. The gathering device is open and the charge deposited into the mold while the roller 54 is moving from $b$ to $c$, that is, while the gathering mechanism and rotating frame are traveling at the same rate of speed with the gathering device directly above the mold.

The cam groove 55 bends in from $c$ to $d$. This results in an inward movement of the slide 53 and a forward movement of the gathering mechanism upon the rotating frame. In other words, the gathering mechanism now travels at a greater velocity than the rotating frame. By the time the roller 54 has reached the point $d$ the presser is positioned over the mold. From $d$ to $e$ the camway 55 is again concentric with the axis of the machine so that the gathering mechanism and the rotating frame have the same speed. During this period the presser is forced down into the mold by means of an inward bend in the camway 119 which, operating upon the slide 114, rocks the bell cranks 109 and lowers the presser as a whole until the cover 88 is seated on the mold 56 and then forces the plunger down into the body of metal in the mold. The presser is then raised by a reverse movement of this mechanism. The camway 55 takes another inward bend from *e* to *f*. This results in another forward movement of the gathering mechanism on the rotating frame which moves the presser out of line with the mold and brings the gathering mechanism back to its original position. From *f* around to *a* the cam is again concentric with the axis of the machine. During this period the mold is inverted to discharge the finished article and thereafter returned to its original position; this operation being accomplished by the movement of the slide 80 actuated by cam 85, the rack 79 on the slide rotating shaft 75 and pinion 74. The latter by its engagement with the rack 67 moves the slide 68, 69 and gives a half revolution through the pin and slot connection 66, 67 to the shaft 61 on which the mold is mounted.

The machine is preferably provided with an air pipe 142 arranged under the mold. A blast of air may be directed against the mold through this pipe either continuously or at suitable intervals for the purpose of cooling the mold.

As has been pointed out, the present application is limited expressly to the described and claimed mechanism for the making of pressed ware. Therefore I do not herein claim any of the patentable mechanisms herein shown and described apart from the mechanism relating particularly to the manufacture of pressed ware, but reserve the right to separately claim such other devices in various co-pending applications, and particularly in my co-pending application, Serial No. 570,621, filed July 6, 1910, and divisional applications thereof in which I describe and claim the gathering mechanism, the cut-off mechanism, and the air control mechanism.

I claim:

1. In a machine for making pressed glassware, the combination of gathering mechanism, a mold adapted to receive a charge of glass from the gathering mechanism, pressing mechanism which coöperates with the mold, means for actuating said pressing mechanism and a single rotatable supporting structure common to all of said apparatus.

2. In a machine for making pressed glassware, the combination of gathering mechanism, a mold adapted to receive a charge of glass from the gathering mechanism, pressing mechanism which coöperates with the mold, means for actuating said pressing mechanism, means for inverting the mold to discharge the article when pressed and a single rotatable supporting structure common to all of said apparatus.

3. In a machine for making pressed glassware, the combination of gathering mechanism, a mold, means for bringing said gathering mechanism and mold into alinement with each other with the gathering mechanism standing above the mold and for thereafter separating said elements, a presser, means for bringing the presser and mold into alinement with the presser above the mold, actuating mechanism for the presser and a single rotatable supporting structure common to all of said apparatus.

4. In a machine for making pressed glassware, the combination of gathering mechanism, a mold, means for bringing said gathering mechanism and mold into alinement with each other with the gathering mechanism standing above the mold and for thereafter separating said elements, a presser, means for bringing the presser and mold into alinement with the presser above the mold, actuating mechanism for the presser, means for inverting the mold to discharge the finished article and a single rotatable supporting structure common to all of said apparatus.

5. In a machine for making pressed glassware, the combination with a glass furnace, of gathering mechanism, means for introducing the gathering mechanism into and withdrawing it from the furnace, a mold adapted to receive a charge of glass from the gathering mechanism, pressing mechanism which coöperates with the mold, means for actuating said pressing mechanism and a single rotatable supporting structure common to all of said apparatus except the furnace.

6. In a machine for making pressed glassware, the combination with a glass furnace, of a gathering mechanism, means for introducing said gathering mechanism into and withdrawing it from the furnace, a mold, means for bringing said gathering mechanism and mold into alinement with each other with the gathering mechanism standing above the mold and thereafter separating said elements, a presser, means for bringing said presser and mold into alinement with each other with the presser above the mold, mechanism for actuating the presser and a single rotatable supporting structure common to all of said apparatus except the furnace.

7. In a machine for making pressed glassware, the combination with a glass furnace, of a gathering mechanism, means for introducing said gathering mechanism into and withdrawing it from the furnace, a mold, means for bringing said gathering mechanism and mold into alinement with each other with the gathering mechanism standing above the mold and thereafter separating said elements, a presser, means for bringing said presser and mold into alinement with each other with the presser above the mold, mechanism for actuating the presser, means for moving the presser and mold out of alinement with each other, and a single rotatable supporting structure common to all of said apparatus except the furnace.

8. In a machine for making pressed glassware, the combination with a glass furnace, of a gathering mechanism, means for introducing said gathering mechanism into and withdrawing it from the furnace, a mold, means for bringing said gathering mechanism and mold into alinement with each other with the gathering mechanism standing above the mold and thereafter separating said elements, a presser, means for bringing said presser and mold into alinement with each other with the presser above the mold, mechanism for actuating the presser, means for moving the presser and mold out of alinement with each other, means for inverting the mold and a single rotatable supporting structure common to all of said apparatus except the furnace.

9. In a machine for making pressed glassware, the combination with a glass furnace, of a support having translatory movement past the furnace, a gathering device, mechanism carried by said support, means for introducing said gathering device into and withdrawing the same from the furnace, a mold adapted to receive a charge from said gathering device, a presser, means for moving the same to and from the mold and a single rotatable supporting structure common to all of said apparatus except the furnace.

10. In a machine for making pressed glassware, the combination with a glass furnace, of a support having translatory movement past the furnace, a gathering device, mechanism carried by said support, means for introducing said gathering device into and withdrawing the same from the furnace, a mold adapted to receive a charge from said gathering device, a presser, means for moving the same to and from the mold, mechanism which operates to stop the translatory movement of the gathering device with respect to the furnace while said gathering device is entering and being withdrawn from said furnace and to return the gathering device to its original position on the support and a single rotatable supporting structure common to all of said apparatus except the furnace.

11. In a machine for making pressed glassware, the combination with a glass furnace, of a support having translatory movement past the furnace, a gathering device carried by said support, means for introducing said gathering device into and withdrawing the same from the furnace, a mold on the support, a presser carried by said support, and mechanism which operates to position the gathering device above the mold and then to position the presser above said mold.

12. In a machine for making pressed glassware, the combination with a glass furnace, of a support having translatory movement past the furnace, a gathering device carried by said support, means for introducing said gathering device into and withdrawing the same from the furnace, a mold on the support, a presser carried by said support, and mechanism which operates to stop the translatory movement of the gathering device with respect to the furnace while it enters and is withdrawn from the furnace and to position the same above the mold and then to position the presser above said mold.

13. In a machine for making pressed glassware, the combination with a glass furnace, of a support having translatory movement past the furnace, a gathering device carried by said support, means for introducing said gathering device into and withdrawing the same from the furnace, a mold on the support, a presser carried by said support, and mechanism which operates to stop the translatory movement of the gathering device with respect to the furnace while it enters and is withdrawn from the furnace and to position the same above the mold and then to position the presser above said mold and thereafter returns the gathering device to its original position on the support.

14. In a machine for making pressed glassware, the combination with a glass furnace, of a support having translatory movement past the furnace, a gathering device carried by said support, means for introducing said gathering device into and withdrawing the same from the furnace, a mold on the support, a presser carried by said support, mechanism which operates to stop the translatory movement of the gathering device with respect to the furnace while it enters and is withdrawn from the furnace and to position the same above the mold and then to position the presser above said mold and thereafter returns the gathering device to its original position on the support, and means for inverting the mold.

15. In a machine for making pressed glassware, the combination with a glass furnace, of a support having translatory movement past said furnace, a gathering device mounted on said support so as to be movable into and out of the furnace and also movable along the line of travel of the support, a mold rigidly secured to said support, a presser arranged so that it moves with the gathering device along the line of travel of the support, and mechanism which operates to first position the gathering device above the mold and thereafter the presser above said mold.

16. In a machine for making pressed glassware, the combination with a glass furnace, of a support having translatory movement past said furnace, a gathering device mounted on said support so as to be movable into and out of the furnace and also movable along the line of travel of the support, a mold rigidly secured to said support, a presser arranged so that it moves with the gathering device along the line of travel of the support, and mechanism which operates to first stop the translatory movement of the gathering device with respect to the furnace and thereafter to position the gathering mechanism and presser above the mold, respectively.

17. In a machine for making pressed glassware, the combination with a glass furnace, of a support having translatory movement past said furnace, a gathering device mounted on said support so as to be movable into and out of the furnace and also movable along the line of travel of the support, a mold rigidly secured to said support, a presser arranged so that it moves with the gathering device along the line of travel of the support, and mechanism which operates to first stop the translatory movement of the gathering device with respect to the furnace and thereafter to position the gathering mechanism and presser above the mold respectively, and finally to return the gathering device to its original position on the support.

18. In a machine for making pressed glassware, the combination with a glass furnace, of a support having translatory movement past said furnace, a gathering device mounted on said support so as to be movable into and out of the furnace and also movable along the line of travel of the support, a mold rigidly secured to said support, a presser arranged so that it moves with the gathering device along the line of travel of the support, mechanism which operates to first stop the translatory movement of the gathering device with respect to the furnace and thereafter to position the gathering mechanism and presser above the mold respectively, and finally to return the gathering device to its original position on the support, and means for inverting the mold.

19. In a machine for making pressed glassware, the combination with a glass furnace, of a rotary support, a gathering device, a mold, and a presser all carried on said support, mechanism for introducing the gathering device into and withdrawing it from the furnace, mechanism for bringing first the gathering device and mold and then the mold and presser into alinement one with another, and means for actuating the presser.

20. In a machine for making pressed glassware, the combination of a rotary support, a measuring device movable circumferentially on said support, a mold fixed to the support, a presser arranged so as to move circumferentially on the support with said gathering device, and mechanism for bringing the gathering device into position above the mold and then to position the presser above the mold.

21. In a machine for making pressed glassware, the combination with a glass furnace, of a rotary support, a gathering device movable circumferentially on said support, a mold fixed to the support, a presser arranged so as to move circumferentially on the support with said gathering device, mechanism which operates at one time to stop the circumferential movement of the gathering device and at another to move said gathering device in the same direction as the support but with greater velocity, and a cam to actuate said last mentioned mechanism.

22. In a machine for making pressed glassware, the combination with a glass furnace, of a rotary support, a gathering device movable circumferentially on said support, a mold fixed to the support, a presser arranged so as to move circumferentially on the support with said gathering device, mechanism which operates at one time to stop the circumferential movement of the gathering device and at another to move said gathering device in the same direction as the support but with greater velocity, and a cam to actuate said last mentioned mechanism so as to first position the same above the mold and then to position the presser above said mold.

23. In a machine for making pressed glassware, the combination with a glass furnace, of a rotary support, a gathering device movable circumferentially on said support, a mold fixed to the support, a presser arranged so as to move circumferentially on the support with said gathering device, mechanism which operates at one time to stop the circumferential movement of the gathering device and at another to move said gathering device in the same direction as the support but with greater velocity, and a cam to actuate said last mentioned mechanism so as to position the gathering device and presser above the mold, respectively, and hold each of said elements above the mold for appreciable periods of time.

24. In a machine for making pressed glassware, the combination with a glass furnace, of a rotary support, a gathering device movable circumferentially on said support, a mold fixed to the support, a presser arranged so as to move circumferentially on the support with said gathering device, mechanism which operates at one time to stop the circumferential movement of the gathering device and at another to move said gathering device in the same direction as the support but with greater velocity, and a cam to actuate said last mentioned mechanism so as to first position the same above the mold and then to position the presser above said mold and hold each of said elements above the mold for appreciable periods of time, and thereafter return the gathering device to its original position on the support.

25. In a machine for making pressed glassware, the combination with a glass furnace, of a rotary support, a gathering device movable circumferentially on said support, a mold fixed to the support, a presser arranged so as to move circumferentially on the support with said gathering device, mechanism which operates at one time to stop the circumferential movement of the gathering device and at another to move said gathering device in the same direction as the support but with greater velocity, a cam to actuate said last mentioned mechanism so as to first position it above the mold and then to position the presser above the same and hold said elements above the mold for appreciable periods of time and thereafter return the gathering device to its original position on the support, and mechanism for inverting the mold.

26. In a machine for making pressed glassware, the combination of a rotary support, a glass containing device mounted on said support so as to be capable of circumferential movement with respect thereto, a mold on said support, a presser connected with the glass containing device, and mechanism for bringing the mold into alinement first with the glass containing device and then with the presser.

27. In a machine for making pressed glassware, the combination of a movable support, a mold, a revoluble shaft on which the mold is fixed formed with a spiral slot, a slide provided with a pin entering said slot, and means actuated by the movement of said support for reciprocating said slide so as to invert the mold and return the same to its original position.

28. In a machine for making pressed glassware, the combination with a mold, of a revoluble shaft supporting said mold and formed with a spiral slot, a slide having a pin which enters said slot, and mechanism for reciprocating said slide.

29. In a machine for making pressed glassware, the combination with a glass gathering device, a mold, a presser, mechanism for first bringing the gathering device and mold into alinement so that the mold may receive the charge of glass and thereafter bringing the mold and presser into alinement, means for reciprocating the presser, and a single rotatable supporting structure common to all of said apparatus.

30. In a machine for making pressed glassware, the combination with a rotary support, of a glass gathering device, a mold and a presser all carried on said rotary support, mechanism actuated by the movement of said support for first alining the mold and glass gathering device so that the mold may receive the charge from the glass gathering device, then alining the mold and presser and thereupon reciprocating the presser, and a stationary supporting structure common to all of said apparatus.

31. In a machine for making pressed glassware, the combination with a rotary support, of a glass containing device, a mold and a presser all carried on said rotary support, mechanism actuated by the movement of said support for first alining the mold and glass containing device so that the mold may receive the charge from the glass containing device, then alining the mold and presser and thereupon reciprocating the presser, and mechanism for inverting the mold to discharge the finished article.

32. In a glass shaping means the combination of a carrier traveling in a predetermined path, a gathering device thereon, a pressing device thereon, and means for transferring the gather from the gathering device to the pressing device.

33. In a glass shaping machine, the combination of a carrier traveling in a predetermined path, a glass gathering device thereon, a glass press separated therefrom on the same carrier, and means for moving the gathering device and the mold of the press into and out of feeding relation and for operating the press.

34. In a glass shaping machine, the combination of a traveling frame, a gathering device thereon, a press-mold and press-plunger thereon beside the gathering device, means for moving the gathering device and the press-mold into feeding relation and withdrawing the gathering device away from the press-mold for actuating the press-plunger to press the article in the mold and to withdraw the same and invert the mold to discharge the article, such mechanism being combined to automatically operate during each cycle of travel of the frame.

35. In a glass shaping machine, the combination with a carrier traveling in a predetermined path, of a gathering device and a pressing device mounted upon said carrier to travel together therewith, and means for effecting a relative movement between the pressing device and the gathering device to transfer the gather from the gathering device to the pressing device.

AUGUST KADOW.

Witnesses:
 GEORGE E. DIXON,
 L. F. LUSCOMBE.